_Patented Sept. 12, 1950_

2,521,809

UNITED STATES PATENT OFFICE 2,521,809

PREPARATION OF ACETAMIDOMALONATES

Max Tishler, Rahway, and Eugene E. Howe, Linden, N. J., assignors to Merck & Co., Inc., Rahway, N. J., a corporation of New Jersey No Drawing. Application February 9, 1946, Serial No. 646,701

4 Claims. (Cl. 260—482)

This invention relates to processes for preparing $\alpha$-acylamido acetic ester compounds and particularly to the preparation of such compounds from corresponding $\alpha$-isonitroso acetic esters. $\alpha$-Acylamido acetic esters, and particularly those having an $\alpha$-substituent of the class consisting of acyl, ester, and cyano radicals are useful as intermediates in chemical processes such as the synthesis of amino acids.

Acylamido malonic esters represent a comparatively new type of compound, and were first prepared by reacting aminomalonic esters with acylating agents such as acetyl chloride (Cerchez, Bul. Soc. Chem. 49, 45–47 (1931)). While the acylation procedure of this publication gives high per cent conversion of aminomalonic ester to acetamido malonic ester, aminomalonic ester is itself unstable and can be made only in relatively poor yields with the result that overall yield of acetamido malonic ester from malonic ester by this procedure is only about 57%.

It has also been disclosed by Snyder and Smith, J. A. C. S. 66, 350 (1944), that acetamido malonic ester can be prepared by subjecting isonitroso malonic ester (obtained by the procedure of Cerchez, Bul. Chem. Soc. 47, 1279 (1930)) to catalytic reduction in ethanol with a palladium-charcoal as catalyst and, after removal of the catalyst, acetylating with acetic anhydride. This preparation of acetamido malonic ester, however, results in only a 40% yield based upon the malonic ester used, and is subject to the further disadvantage that the catalyst is easily poisoned.

It is now discovered, in accordance with the present invention, that it is possible to obtain $\alpha$-acylamido acetic ester compounds in very good yields by first preparing the $\alpha$-isonitroso (or as alternatively termed the $\alpha$-oximino) derivative of the ester and subjecting the same to reductive acylation with powdered zinc or powdered iron as a reducing agent.

Regarded in certain of its broader aspects, the novel process according to the present invention comprises reacting $\alpha$-isonitroso $\alpha$-(X) acetic ester, wherein X is of the class consisting of acyl, ester, and cyano radicals, with a lower aliphatic carboxylic acid, its anhydride, and a reducing agent of the class consisting of powdered zinc and powdered iron, and recovering from the reaction mixture the corresponding $\alpha$-acylamido $\alpha$-(X) acetic ester.

In preparing the reaction medium, the reducing agent can be added to the cooled (10–20° C.) mixture of acid and anhydride slowly and with vigorous stirring, or alternatively, the $\alpha$-isonitroso acetic ester compound can be first mixed with the acid and anhydride.

Reduction and simultaneous acylation using the type reaction medium first mentioned above is effected by adding the $\alpha$-isonitroso acetic ester compound slowly, with stirring, to the mixture of reactants while cooling to maintain proper temperature, the reaction being exothermic. If the $\alpha$-isonitroso acetic ester compound is not a liquid, it can be mixed with some of the acid or solvent employed in the mixture above referred to.

When zinc dust is used as the reducing agent, the temperature is preferably held between 10 and 20° C. during this addition. When iron dust or iron powder is used as the reducing agent, the temperature must be held at a slightly higher level, 25 to 35° C., during the addition, as lower temperatures retard the reaction, allowing for accumulation of unreacted material which may react violently once the reaction is underway.

After the addition is completed, the reaction mixture is stirred for a more or less extended period (2 to 18 hours depending on the particular compound being prepared) to permit the reaction to go to completion. The reaction is exothermic and the heat of reaction will raise the temperature somewhat above room temperature. A slight rise in temperature during this period is not objectionable and external cooling is not generally necessary. When the reaction is complete, the drop in temperature of the reaction mixture indicates that stirring can be discontinued. The reaction mixture is then filtered and worked up by conventional isolation and purification steps to yield the crystalline $\alpha$-acylamido acetic ester compound.

The second $\alpha$ substituent, i. e., the acyl, ester, or cyano radical, in the $\alpha$-isonitroso acetic ester compounds does not affect the reaction, and compounds having any acyl or ester group or the cyano radical as the second $\alpha$ substituent can be reacted in the manner described to yield the corresponding $\alpha$ substituted $\alpha$-acylamido acetic ester.

In the reductive acylation reaction, the various reactants are employed in the following approximate proportions: 1 mole of the $\alpha$-isonitroso acetic ester compound, 2.9 moles of the organic acid anhydride, 14.2 moles of the organic carboxylic acid, and 5.5 to 6.5 moles of the reducing agent (zinc or iron). Increasing the molar proportion of the anhydride serves no useful purpose as it does not increase the yield. The molar proportion of the reducing agent should not be lowered appreciably below the range given above as this results in a low yield and low melting or impure product.

When the second type reaction medium is employed, (i. e., the α-isonitroso acetic ester compound is first mixed with the acid and anhydride) the reactants are used in the same molar ration as that given above except that the amount of zinc dust used may be reduced to 3.85 moles. The reducing agent is added slowly with stirring to the reaction medium; however, with this procedure, it is not necessary to cool the reaction medium during the addition. The heat of reaction, when the reducing agent is added over a period of about 1½ hours, will maintain a temperature of about 40 to 50° C. The markedly exothermic reaction is completed by the end of the addition of reducing agent or slightly prior thereto, and it is not essential to continue agitation of the reaction mixture for more than about one-half hour after all of the reducing agent has been added.

Comparable yields are obtained by the two procedures. For example, the yield of acetamido malonic ester, based upon the amount of malonic ester originally used, is about 84% when the reaction is carried out by adding the α-isonitroso compound to the other reactants, and about 81.5% when the zinc dust is added to the other reactants. The slightly lower yield by the latter procedure is more than offset by the fact that this procedure is more economical, particularly in that cooling is completely eliminated, time of reaction is reduced, and less zinc dust is required.

The following examples illustrate methods of carrying out the present invention, but it is to be understood that these examples are given by way of illustration and not of limitation.

*Example I*

Equip a dry 500 ml. three-necked, round-bottomed flask with a stirrer and immersion thermometer, and mount in an ice bath. After placing 60 g. of acetic anhydride (.586 mole) and 170 ml. of glacial acetic acid (2.84 moles) in the flask, cool the solution to 10° C. and add, with vigorous stirring, 83.5 g. of zinc dust (1.28 moles) over a period of 15 minutes. The mixture is cooled again to about 10° C. before the addition of the isonitroso malonic ester is started.

With stirring, add 37.8 g. of the diethyl ester of isonitroso malonic acid (.2 mole) from a 100 ml. dropping funnel, keeping the temperature below 20° C. The addition requires about 2 hours and must be carried out slowly since the reaction is quite exothermic. When all the oil has been added, remove the flask from the ice bath and stir at room temperature for four hours. During this period, the temperature reaches a maximum of 38-40° C. Prolonging the stirring to eight hours after the addition of the isonitroso does not improve the yield of acetamino malonic ester.

Filter the reaction mixture and wash the residue thoroughly with three-100 ml. portions of glacial acetic acid. After combining the washings and filtrate, concentrate the whole in vacuo to a thick oil which sometimes partially crystallizes, and remove last traces of solvent by adding 100 ml. of water and concentrating again. To obtain a nicely crystalline product, add 100 ml. of water, and heat the flask on a steam bath until the solid melts. Next stir the mixture of oil and water vigorously while cooling in an ice bath. The diethyl ester of acetamino malonic acid precipitates out immediately as fine white crystals. Chill in the ice box for three hours or longer, filter and wash with three 100 ml. portions of ice cold water. After drying in a hot air oven at 50° C. overnight, the yield of acetamino malonic ester is 84% (36.4 g.). The product melts at 94-97° C., and can be condensed with gramine without further purification to prepare skatylacetamido malonic ester in the gramine synthesis of tryptophane.

*Example II*

Into a 500 cc. three-necked flask equipped with a mechanical stirrer, a dropping funnel and a condenser through which is suspended an immersion thermometer are introduced 60 grams of acetic anhydride and 170 cc. of glacial acetic acid. The solution is cooled to 20° C. whereupon 71.5 g. (1.28 moles) of iron dust are added with vigorous stirring. The mixture is then brought to room temperature and 37.8 g. of ethyl isonitrosomalonate are added over a period of two hours during which time the temperature is maintained between 25-35° C.

The isonitroso malonic ester addition must not be started below 25° C. since at lower temperatures the reaction proceeds very slowly, thus allowing the accumulation of considerable unreacted material which may react violently once the reaction is underway.

After all of the ester has been added, the ice bath is removed and the mixture is stirred at room temperature for four hours. The mixture is filtered and the solid is washed with 5 x 100 cc. of glacial acetic acid. The dark red filtrate and washings are combined and concentrated under reduced pressure to a heavy oil. 100 cc. of water are added and the solution is again concentrated. The residue is dissolved in 100 cc. of boiling water, after which the solution is chilled in an ice bath with rapid stirring. Fine white crystals of ethyl acetamidomalonate separate. After three hours in the ice bath, the crystals are collected on a Buchner funnel and washed with 3 x 100 and 2 x 50 cc. of ice water. Yield: 23.9 g.-55%; M. P. 95-97° C.

*Example III*

The procedure described in Example I is repeated using in place of the acetic acid and acetic anhydride about 210 cc. (2.84 moles) of propionic acid and about 76 g. (.585 mole) of propionic anhydride. During the addition of ethyl isonitroso malonate, the temperature is kept below 20° C., and after the completion of this addition, the mixture is stirred for an extended period, about 18 hours, during which time the temperature is maintained at about 30-31° C. by the heat of reaction. The reaction mixture is worked up as described in Example I and, after recrystallization from 95% ethanol, a yield of about 40% of the diethyl ester of propionamido malonic acid, melting at 92-94° C. is obtained. The elementary analysis is as follows: Theory: 52% C, 7.37% H, 6.07% N. Found: 52.19% C, 7.36% H, 6.33% N. Additional amounts of the product can be recovered by working up the mother liquors.

*Example IV*

A solution of about 31.8 g. (0.2 mole) of the ethyl ester of α-isonitroso acetoacetic acid, M. P. 56-59° C. (prepared according to the procedure disclosed by Adkins and Reeve, J. A. C. S. 60, 1328 (1938)) in about 30 cc. of glacial acetic acid is added dropwise over a period of about two hours to a well-stirred mixture of 110 cc. of glacial acetic acid, 55 cc. (.585 mole) of acetic anhydride and about 83.5 g. (1.28 moles) of zinc dust. During the addition, the temperature is held at about 10-15° C. by ice cooling. The ice is then removed and the mixture is stirred for about four hours during which time the temperature rises to a maximum of 30° C. due to heat of reaction. The reaction mixture is filtered and washed with about four 15 cc. portions of glacial acetic acid. The water-white filtrate is concentrated by heating to about 60° C. under reduced pressure (first slightly reduced and then lowered to about 7 mm. until nothing further distills off.

The remaining pinkish oil (about 41.8 g.) is treated with 25 cc. of water and then extracted with two 50 cc. portions and then with two 25 cc. portions of chloroform. The extract is washed with water, sodium bicarbonate solution and some water, and is then dried over sodium sulfate and concentrated to constant weight under vacuum. About 35.1 g. (93.8% of theory) of ethyl acetamidoacetoacetate is recovered as a viscous oil which crystallizes upon cooling. The nearly white crystalline product melts at about 45-48° C. Purification by recrystallization from toluene yields a product melting at about 47.5-48.5° C. and having the following partial analysis: Calculated: 51.34% C, 6.95% H. Found: 51.56% C, 7.08% H.

Example V

A solution of about 14.2 g. (0.1 mole of the ethyl ester of α-isonitroso cyanoacetic acid (prepared according to the procedure of Conrad and Schulze, Ber. 42 736 (1909) and melting at about 127-129° C.) in about 40 cc. of glacial acetic acid is added dropwise over a period of about one hour to a well-stirred mixture of about 55 cc. of glacial acetic acid, 27.6 cc. (1.292 moles) of acetic anhydride and 41.8 g. (.64 mole) of zinc dust while maintaining the temperature at about 10-15° C., with ice cooling. Considerable heat is evolved in the reaction. After completion of the addition, the reaction mixture is stirred for about two hours with cooling, if necessary, to keep the temperature below about 30° C. The reaction mixture is then filtered and the residue washed with glacial acetic acid. The water-white filtrate and washings are concentrated to dryness under vacuum, yielding white needle crystals. After recrystallization from about 80 cc. of hot water, about 10.7 g. (63% of theory) of the ethyl ester of α-acetamidocyanoacetic acid, melting at about 129-130° C. is obtained as a first crop having the following partial analysis: Calculated: 49.40% C, 5.92% H. Found: 49.43% C, 5.99% H. Additional product can be obtained by working up the mother liquors.

Example VI

About 80 g. (1.23 moles) of zinc dust is added slowly to an agitated solution of about 58.5 g. (0.31 mole) of the diethyl ester of α-isonitroso malonic acid in 225 cc. of glacial acetic acid and 80 cc. (0.84 mole) of acetic anhydride. The addition is made over a period of about 1½ hours without external cooling of the reaction mixture. The reaction is markedly exothermic during the first seven-eighths of the addition, maintaining a temperature of about 40-50° C. in the reaction mixture, and thereafter evolution of heat drops off. The mixture is agitated, without cooling, for about one-half hour after all the zinc dust is added. The mixture is then filtered, the solid is washed with glacial acetic acid, and the combined filtrate and washings are worked up as in Example I, yielding about 55.3 g. (81.5% based upon malonic ester) of the diethyl ester of acetamido malonic acid, M. P. 95-97° C.

Example VII

The procedure of Example VI is repeated with the exception that the temperature is held at about 18-20° C., during the addition of zinc dust, and after completion of the addition, the mixture is agitated for about four hours without cooling. The yield of the diethyl ester of acetamido malonic acid, M. P. 95-97° C., is about 81.5%.

Modifications may be made in carrying out the present invention without departing from the spirit and scope thereof, and the invention is to be limited only by the appended claims.

What is claimed is:

1. The process that comprises reacting an α-isonitroso malonic ester with an anhydrous mixture of a lower alkyl carboxylic acid and its anhydride in the presence of a reducing agent of the class consisting of powdered zinc and powdered iron, and recovering from the reaction mixture the corresponding α-acylamido malonic ester.

2. The process that comprises adding zinc dust to an anhydrous mixture of α-isonitroso-malonic ester, glacial acetic acid, and acetic anhydride, while agitating said mixture, completing the addition of the zinc dust in about one and one-half hours, and continuing agitation for about one-half hour thereafter, and recovering from the reaction mixture α-acetamido malonic ester.

3. The process that comprises reacting α-isonitroso malonic ester with an anhydrous mixture of glacial acetic acid and acetic anhydride in the presence of zinc dust, and recovering from the reaction mixture α-acetamido malonic ester.

4. The process for reductively acylating ethyl isonitrosomalonate to form the corresponding ethyl acetamidomalonate which comprises treating such ethyl isonitrosomalonate with a mixture of acetic acid, acetic anhydride and zinc.

MAX TISHLER.
EUGENE E. HOWE.

REFERENCES CITED

The following references are of record in the file of this patent:

UNITED STATES PATENTS

| Number | Name | Date |
|---|---|---|
| 1,878,969 | Mills | Sept. 20, 1932 |
| 2,306,765 | Stiller | Dec. 29, 1942 |
| 2,393,723 | Tullar | Jan. 29, 1946 |

OTHER REFERENCES

Tingle et al., "Am. Chem. J.," vol. 37 (1907), pp. 51, 52, 57, 58, 63 and 64.

Auwers, "Liebigs Annalen," vol. 369 (1909), pp. 210, 229 and 230.

Conrad et al., "Berichte deutsche Chem. Gesell," vol. 42 (1909), pp. 733 and 736.

Snyder et al., "Jour. of Am. Chem. Soc.," vol. 66 (1944), p. 351.